United States Patent [19]

Palmer

[11] Patent Number: 5,438,355
[45] Date of Patent: Aug. 1, 1995

[54] INTERACTIVE SYSTEM FOR PROCESSING VIEWER RESPONSES TO TELEVISION PROGRAMMING

[76] Inventor: Shelton L. Palmer, 19 W. 36th St., 11th Floor, New York, N.Y. 10018-7909

[21] Appl. No.: 47,445

[22] Filed: Apr. 16, 1993

[51] Int. Cl.⁶ .......................................... H04N 7/173
[52] U.S. Cl. ........................................ 348/1; 348/13; 455/2; 455/5.1
[58] Field of Search ............... 348/1, 2, 7, 12, 13; 455/2, 4.2, 5.1, 6.1, 6.2; 358/84, 86; H04N 7/16, 7/173

[56] References Cited

U.S. PATENT DOCUMENTS

| | | |
|---|---|---|
| 4,071,697 | 1/1978 | Bushnell et al. |
| 4,451,701 | 5/1984 | Bendig. |
| 4,567,512 | 1/1986 | Abraham. |
| 4,603,232 | 7/1986 | Kurland et al. ............... 348/1 |
| 4,646,145 | 2/1987 | Percy et al. |
| 4,734,858 | 3/1988 | Schlafly. |
| 4,745,468 | 5/1988 | Von Kohorn. |
| 4,752,954 | 6/1988 | Masuko ........................ 348/1 |
| 4,876,592 | 10/1989 | Von Kohorn. |
| 4,893,248 | 1/1990 | Pitts et al. .................... 348/1 |
| 4,926,255 | 5/1990 | Von Kohorn. |
| 5,014,125 | 5/1991 | Pocock et al. ................ 455/4.2 |
| 5,128,752 | 7/1992 | Von Kohorn. |
| 5,142,690 | 8/1992 | McMullan, Jr. et al. ...... 455/6.1 |
| 5,155,591 | 10/1992 | Wachob. |
| 5,223,923 | 6/1993 | Morales-Garza .............. 455/2 |
| 5,287,181 | 2/1994 | Holman ........................ 348/1 |
| 5,382,970 | 1/1995 | Kiefl ............................. 348/1 |

FOREIGN PATENT DOCUMENTS 8502743 6/1985 European Pat. Off. .......... 358/86

Primary Examiner—James J. Groody
Assistant Examiner—Chris Grant
Attorney, Agent, or Firm—Lerner, David, Littenberg, Krumholz & Mentlik

[57] ABSTRACT

An interactive television system includes a central exchange and a plurality of consoles variously located at residences of viewers of TV programming. Each console includes a code reader capable of reading program codes, which are broadcasted with the TV signals of programs as unique identifiers thereof. A viewer, upon seeing a TV program of interest, actuates a button, and the console transmits to the central exchange an uniquely identifying console code together with the program code currently being read by the code reader. The central exchange then initiates a facsimile transmission or a datafile transmission of program data, retrieved from a database and associated with the received program code, to the console identified by the received console code.

12 Claims, 2 Drawing Sheets

ND FIELD SYSTEM NO 5,438,355

INTERACTIVE SYSTEM FOR PROCESSING VIEWER RESPONSES TO TELEVISION PROGRAMMING

BACKGROUND OF THE INVENTION

The present invention relates to interactive systems and particularly to a system for processing viewer responses to television programming on a real time or pseudo real time basis.

Television is currently the dominant medium for disseminating entertainment and information to the general public. The television set has become a virtual necessity in almost every household. Viewers spend an average 6.5 hours each day passively watching a wide variety of programming including sitcoms, movies, sports, news and so on. Substantially all television programs disseminated by broadcasters are financed by businesses that buy time from television broadcasters to advertise goods and services. Currently, television advertisers are limited to gross impression advertising which does not provide any direct information as to the effect of their commercials on the viewing public.

It would be highly beneficial to TV advertisers and TV viewers if they could interact on a real time basis, for example, at the times commercials are aired. Advertisers could know which viewers are reacting favorably to their commercials, and viewers could respond directly to advertisers in order to make a purchase and obtain a receipt or other information. In this way, consumer-interactive direct response advertising could be achieved.

In addition to direct response advertising, viewer-interactive television has a multitude of other applications, such as polling, voting, education, game playing, etc.

SUMMARY OF THE INVENTION

It is an objective of the invention to provide an interactive system for processing viewer responses to television programming on a real time or pseudo real time basis. To achieve this objective, the interactive system of the invention comprises a central exchange where a database is stored. This database contains a plurality of first codes uniquely identifying various television programs, a plurality of second codes uniquely identifying consoles located in residences of television viewers, specific program data associated with each first code, and specific console data associated with each second code.

Each console is connected in the path of TV signals to a television receiver and includes a code reader capable of reading the first codes embedded in the TV signals going to the television receiver. The console also includes a register containing the second code identifying the particular console and a controller. When a viewer sees a program, such as a commercial that is of interest and desires to interact with the video to make a purchase or request information regarding the product or service being advertised, he or she responds by signalling the controller. In response, the controller causes the first code currently being read by the code reader and the stored second code to be transmitted to the central exchange. The central exchange then searches the database to determine that the first code is being received from a valid console and to locate the specific program data associated with the received first code. The central exchange computer then retrieves the specific program data associated with the received first code and the specific console data associated with the located second code. Using the retrieved console data, which may include console address information, credit card or other billing information, the retrieved program data is sent to the responding viewer.

In accordance with a feature of the invention, the central exchange and each of the consoles are equipped with a computer and a facsimile apparatus, thereby enabling the central exchange to promptly transmit the retrieved program data to the responding viewer by facsimile transmission. Alternatively, rather than facsimile apparatus, each console can be equipped with a printer to produce a hard copy of the retrieved program data transmitted from the central exchange computer to the console computer in the form of electronic mail.

Additional features and advantages of the invention will be set forth in the description which follows, and in part will be apparent from the description, or may be learned by practice of the invention. The objectives and other advantages of the invention will be realized and attained by the system particularly pointed out in the written description and claims hereof as well as the appended drawings.

It is to be understood that both the foregoing general description and the following detailed description are exemplary and explanatory and are intended to provide further explanation of the invention.

The accompanying drawings are included to provide a fuller understanding of the invention and are incorporated in and constitute a part of this specification, illustrate an embodiment of the invention and, together with the description, serve to explain the principles of the invention.

DETAILED DESCRIPTION

Figure 1:
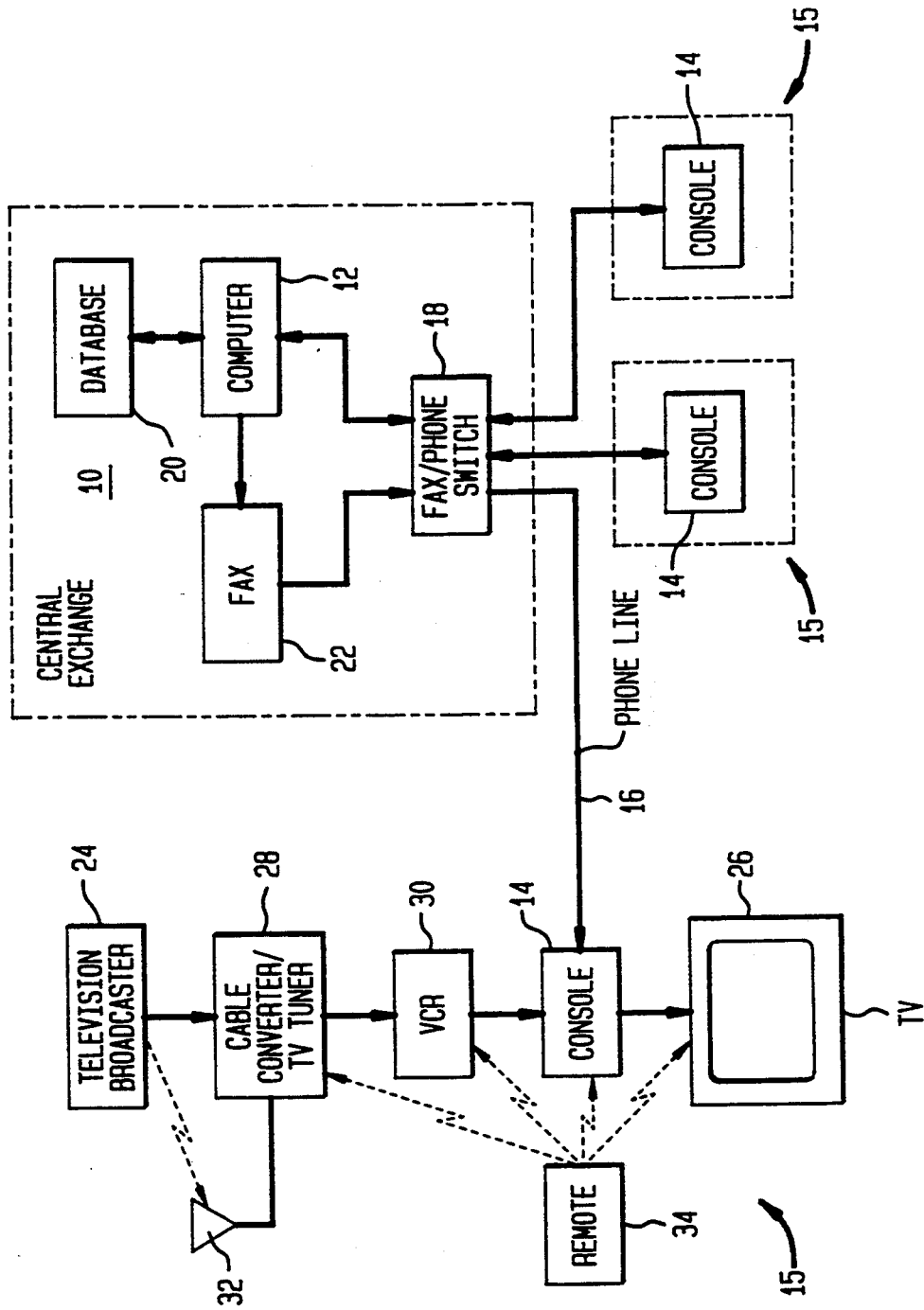
FIG. 1 is a block diagram of a viewer interactive television system constructed in accordance with the present invention.

The viewer interactive television system of the present invention includes, as seen in FIG. 1, a central exchange 10 that includes a computer 12 which receives TV viewer responses from consoles 14 at various viewer locations 15 over phone lines 16, and through a transfer switch 18 and, in response to viewer responses, retrieves information requested by the responding viewers from a database 20. The retrieved information is sent by a facsimile apparatus 22 back to the consoles of the responding viewers via a switch 18 and phone lines 16. It will be appreciated that, rather than phone lines, communications between the central exchange and the consoles may be conducted over cable television lines or via wireless transmissions.

Each console 14 is connected in the path of TV signals transmitted by a television broadcaster 24 to a television receiver 26 through a TV cable converter or TV tuner 28 and a video cassette recorder (VCR) 30 in typical viewer residences. For viewers that are not cable television subscribers, over-the-air TV signals are picked up by antenna 32 and fed to television receiver 26 through TV tuner 28 and console 14. It will be appreciated that, in some cases, a VCR will not be serially connected to the input side of console 14. As a matter of convenience, a remote controller 34 is included to provide the capability for remotely controlling the operations of the television receiver, the VCR, the console and, in some installations, the cable converter.

Further in accordance with the present invention, database 20 at central exchange 10 contains a plurality of program identification codes (PIC) in the form of data uniquely identifying each program or portions of programs broadcasted to television receivers 26 by broadcaster 24. For example, the PIC codes would uniquely identify each commercial transmitted by broadcaster 24. It will appreciated that, in reality, there is a plurality of broadcasters whose signals are picked up by antennas 32 or by a TV cable concern feeding over-the-wire TV signals to converters 28. It will also be appreciated that the TV signals may have been recorded on video tape or discs and thus originate in VCR 30.

The PIC codes are transmitted in conjunction with the TV signals and, in accordance with a feature of the present invention, are inserted in the vertical interval between frames of the video signal. Thus, the PIC codes may be in the form of a vertical interval time codes (VITC) that uniquely identify the particular commercials being broadcasted. The database also includes unique program data associated with each PIC code, which includes information regarding the particular program identified by the PIC code, such as purchase receipts, details regarding the products and services advertised in the commercial, or any other information an advertiser wishes to convey to the viewer via a fax transmission.

In addition, database 20 also contains a plurality of console identification codes (CIC) uniquely identifying each of the plural of consoles 14 in the field and associated console data indicating, for example, where each console is geographically located, billing information, security numbers, phone numbers, viewer habit data, request history, local mailing address, credit card numbers, etc.

Figure 2:
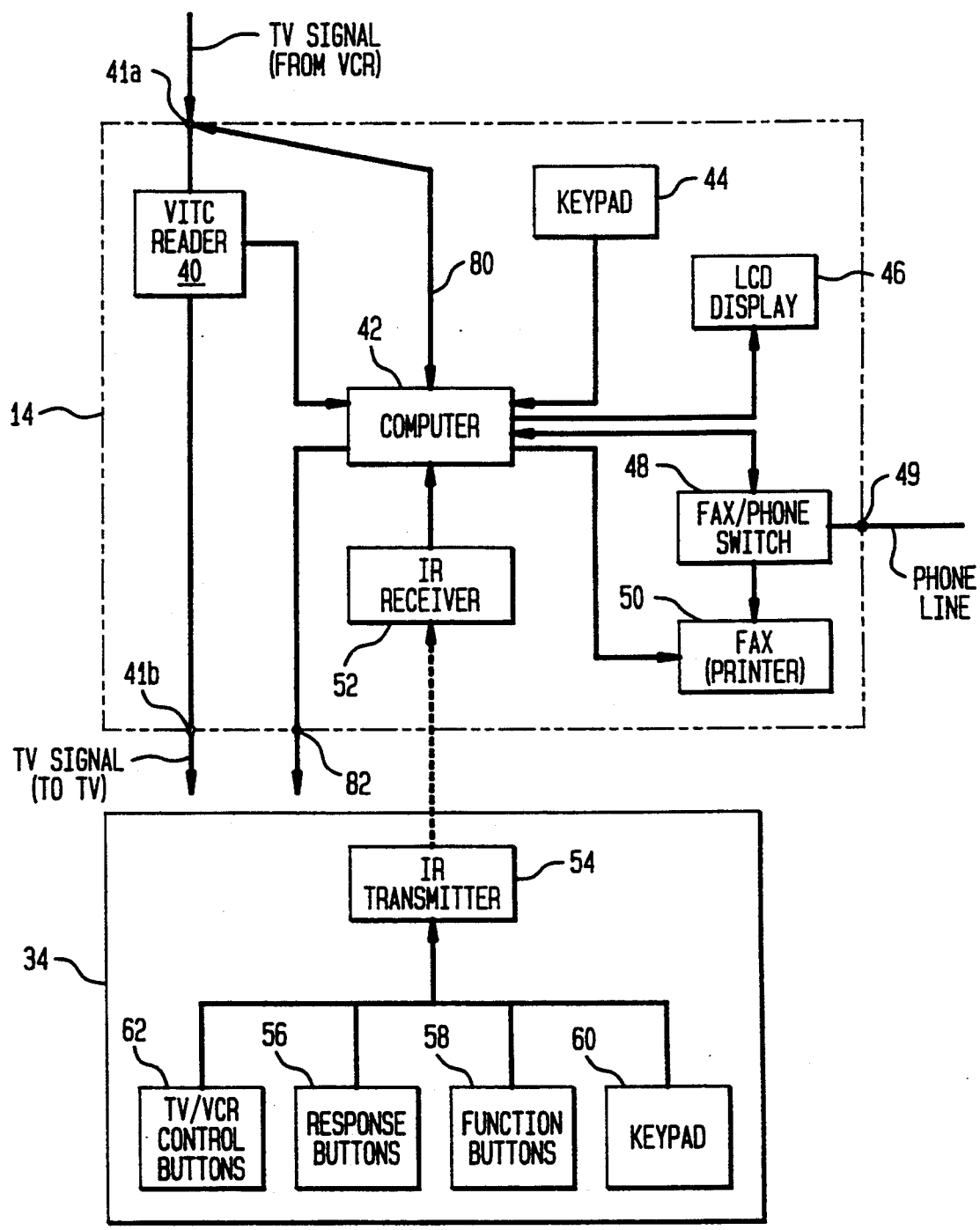
FIG. 2 is a block diagram of a viewer console included in the system of FIG. 1.

Turning to FIG. 2, each console 14 includes a code reader 40 connected between video input port 41a and video output port 41b and thus included in the path of TV signals to the television receiver. This code reader is capable of reading the VITC codes embedded in the TV signals. Each console also includes a controller which may be in the form of a small, special purpose computer 42 having ROM and RAM memory capacity for storing the CIC code identifying the console, a history stack of request data, other identification codes and viewer passwords. Connected to the computer is a keypad 44, a Liquid Crystal Display 46, a facsimile/phone phone transfer switch 48, a facsimile receiver 50 and an infrared (IR) receiver 52. For viewer convenience, each console also includes a remote controller 34 having an infrared (IR) transmitter 54 which transmits infrared control signals to IR receiver 52, as may be generated by sets of response buttons 56, function buttons 58 and a keypad 60. Remote controller may also include TV and VCR control buttons 62 for transmitting IR control signals via transmitter 54 to the television receiver, VCR and cable converter seen in FIG. 1.

In accordance with the operation of the viewer interactive television system of the present invention, when a viewer observes on the television receiver programming or a commercial advertising a product of service of interest, he or she presses the appropriate response button 56 on remote controller 34 or an appropriate key on keypad 44 of the console 14 to generate a viewer response signal which is entered into computer 42. In response, the computer accepts and stores the PIC/VITC code currently being read by code reader 40. The computer then establishes a communications link with central exchange 10 and transmits this PIC/VITC together with the CIC code and user encoded data to computer 12 of the central exchange via switches 48 and 18 and the interconnecting phone line 16 (FIG. 1).

On the basis of the received PIC and CIC codes, computer 12 searches database 20 to locate the matching PIC and CIC codes, and, once located, retrieves the stored program data and console data associated with the matched PIC and CIC codes. Using the retrieved console data, computer 12 feeds the retrieved program data to facsimile machine 22, and facsimile transmission of the program data is sent to facsimile machine 50 of the identified console 14. A hard copy of the program data is printed out for the interested viewer. This may also be done by sending a graphics data file from the central exchange 10 to computer 42 for printout by the console facsimile printer 50. The hard copy provides a receipt for a purchase or a record of a polling choice, a lasting record of the advertised product or service to which the viewer has expressed an interest, details or price, dimensions, features, availability, mail order form, etc., or any other type of printed data. The central exchange can also notify the advertiser of the viewer interest, such that the facsimile copy can be followed up by a mailing of more detailed information included in brochures and sales promotional material. It is also possible to provide broadcasters and advertisers detailed data regarding geographical locations of users, which channels were watched and at what times. This information will be determined by analyzing data gathered at the time of each viewer response and stored in database 20.

Instead of using phone lines, a console computer may transmit PIC and CIC codes to the central exchange and receive program data from the central exchange over a data line 80 and the cable TV lines. In this case, the program data could be embedded in the TV signals, or the central exchange could transmit a code to the console telling the responding viewer's console that the requested program data can be retrieved on a particular channel at a specified time. The viewer can then view the program data on the TV screen and/or print out the program data. In fact, the console computers can be programmed to transmit and receive through any combination of the video ports 41a, 41b and phone jack 49. Also illustrated in FIG. 2 is a serial port 82 which would allow the console computer to be connected to other computers for diagnostics, communications and additional user interaction and programming.

While a receive-only facsimile apparatus is illustrated, it will be appreciated that a separate full compatibility facsimile machine properly connected to the console could be utilized. Rather than a facsimile apparatus, a faxboard could be installed in the console computer which, when equipped with appropriate software, would accept facsimile transmissions and produce a hard copy thereof using a conventional printer. Transfer switch 48 would then be embodied in the console computer.

It is seen that, by virtue of the present invention, consumer interactive direct response advertising is achieved to promote improved sales of goods and services advertised on television, and to provide broadcasters of news, dramatic, game show, talk show, and other programming versatile system for handling interactive communications.

It will be apparent to those skilled in the art that various modifications and variations can be made in the system of the present invention without departing from the spirit or scope of the invention. Thus, it is intended that the present invention cover modifications and variations of this invention provided they come within the scope of the appended claims and their equivalents.

I claim:

1. An interactive system for processing viewer responses to television programming, said system comprising:
   a central exchange including:
      a database containing a plurality of first codes uniquely identifying various television programs, a plurality of second codes, unique program data associated with each first code, and unique console data associated with each second code, and
      a processor; and
   a plurality of consoles, each said console connected in a path of TV signals derived from the television programming to a television receiver and including:
      a code reader for reading the first codes included with TV signals of programs as displayed by the television receiver,
      a register storing the second code uniquely identifying said console,
      a controller, and
      an actuator activated by a viewer in response to a program being displayed by the television receiver to signal said controller to transmit to said processor over a communications link the second code from said register and the first code currently being read by said code reader, whereby, said processor, in response to the received first and second codes, searches the databases to locate the first and second codes corresponding to the received first and second codes and sends the stored program data associated with the received first code to the viewer at a location of said console indicated by the stored console data associated with the received second code.

2. The interactive system defined in claim 1, wherein the stored program data is sent to the viewer over the communications link.

3. The interactive system defined in claim 2, wherein the communications link is a phone line.

4. The interactive system defined in claim 2, wherein the communications link is a cable TV line.

5. The interactive system defined in claim 1, wherein each said console includes a printer for producing a hard copy of the program data received from said central exchange.

6. The interactive system defined in claim 1, wherein the first codes are encoded signals transmitted during vertical interval times between frames of the TV signals.

7. The interactive system defined in claim 6, wherein the program data are encoded signals transmitted during vertical interval times between frames of the TV signals.

8. An interactive system for processing viewer responses to television programming, said system comprising:
   a central exchange including:
      a database containing a plurality of first codes uniquely identifying various television programs, a plurality of second codes, unique program data associated with each first code, and unique console data associated with each second code,
      a data transmitter, and
      a processor; and
   a plurality of consoles, each said console connected in a path of TV signals derived from the television programming to a television receiver and including:
      a code reader for reading the first codes included with TV signals of programs as displayed by the television receiver,
      a printer,
      a register storing the second code uniquely identifying said console,
      a controller, and
      an actuator activated by a viewer in response to a program being displayed by the television receiver to signal said controller to transmit to said processor over a communications link the second code from said register and the first code currently being read by said code reader, whereby, said processor, in response to the received first and second codes, searches the database to locate the first and second codes corresponding to the received first and second codes and activates said data transmitter to transmit the stored program data associated with the received first code to the console identified by the received second code for printout by said printer.

9. The interactive system defined in claim 8, wherein said data transmitter is a first facsimile apparatus and said printer is included in a second facsimile apparatus.

10. The interactive system defined in claim 8, wherein the communications link is a phone line, and said data transmitter sends a facsimile transmission of the program data over the phone line to the identified console.

11. The interactive system defined in claim 10, wherein the first codes are encoded signals transmitted during the vertical interval times between frames of the TV signals.

12. The interactive system defined in claim 8, wherein the communications link is a cable TV line, and said data transmitter sends a facsimile transmission of the program data over the cable TV line to the identified console.

* * * * *